(Model.)

J. W. GROWS.
Float Trap for Wash Basins, &c.

No. 235,629.        Patented Dec. 21, 1880.

Witnesses:
Peter M. Sherwood
C. H. Sherwood

Inventor:
John William Grows

United States Patent Office.

JOHN W. GROWS, OF BROOKLYN, NEW YORK.

FLOAT-TRAP FOR WASH-BASINS, &c.

SPECIFICATION forming part of Letters Patent No. 235,629, dated December 21, 1880.

Application filed April 3, 1880. (Model.)

*To all whom it may concern:*

Be it known that I, JOHN WILLIAM GROWS, of the city of Brooklyn, Kings county, State of New York, have invented a new, useful, and improved Float-Trap for Use on Overflow-Orifices of Wash-Basins, Bath-Tubs, and Tanks, of which this is a specification.

The use of this device is to prevent the entrance of sewer-gas, and at the same time not destroy the only purpose of an overflow—*i. e.*, the proper escape of surplus water to prevent the flooding of basin. My plan avoids this very objectionable fault in the appliances in use heretofore.

Figure 1:
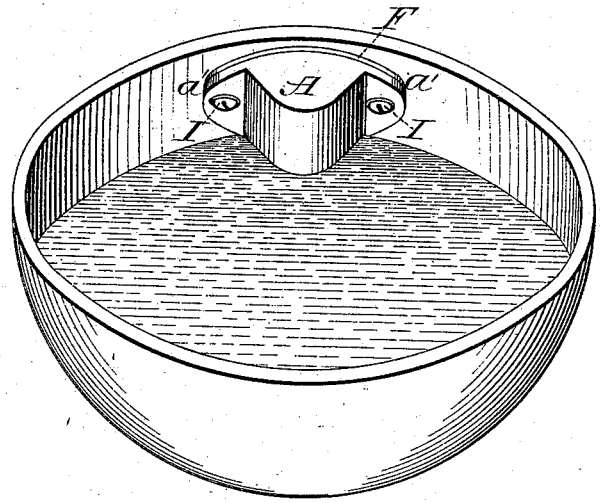
Figure 2:
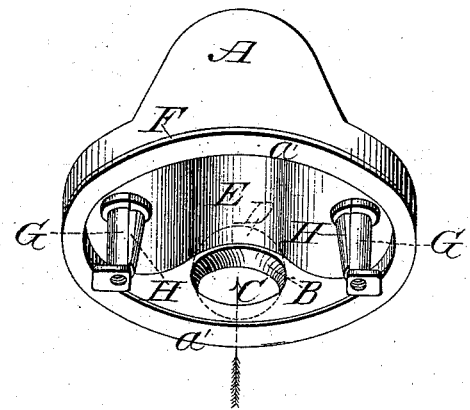
Figure 3:
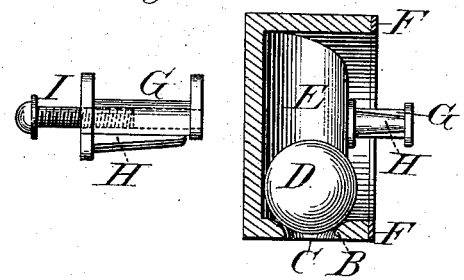

Figure 1 shows basin with this device attached, giving view of its exterior formation. Fig. 2 exhibits its interior construction. Fig. 3 shows the device by which the trap is attached to the basin around the overflow.

This invention consists of a U-shaped cap, A, with curved oval flange $a'$, having a valve-seat, B, in the orifice C at the bottom of said cap. This valve-seat is closed and unclosed by the action of a float-ball, D, made of rubber, metal, or other suitable material, said float-ball being guided by the vertical groove, with curved sides E, in its proper movement.

The trap is attached to the basin by its oval curved flange $a'$, with flat rubber packing-ring F interposed, so that the device may encircle the overflow in an air-tight manner. The trap is secured to the basin by the insertion of the flanges of the tapped shanks G into two of the orifices of overflow, is then made tight in them by the wedges H, and is fastened by the screws I passing through flange $a'$ into the threaded shanks G.

The attachment of this device is simple, and may be quickly and easily made without expense in adjustment. The cap A is attached to the holes of the overflow first by inserting the shanks G into the extreme opposite holes in the sides of the overflow, and secured in place by the wedges H. Then place the cap A over the overflow and secure it by passing the screws I through the holes on the side of cap A and into the threaded holes in shanks G, substantially as described.

Having thus described my invention, I claim as new and desire to secure by Letters Patent—

1. The U-shaped cap A, in combination with curved oval flange $a'$, valve-seat B, orifice C, float-ball D, vertical groove with curved sides E, and flat rubber packing-ring F.

2. Flanged and tapped shanks G, wedges H, and screws I, in combination, substantially for the use as specified above.

JOHN WILLIAM GROWS.

Witnesses:
PETER M. SHERWOOD,
JAS. S. HALL.